United States Patent
Kim et al.

(10) Patent No.: US 7,417,402 B2
(45) Date of Patent: Aug. 26, 2008

(54) NON-CONTACT TYPE BATTERY PACK CHARGING APPARATUS

(76) Inventors: Jin-Sun Kim, 929-38, Bangbae-2dong, Seocho-ku, Seoul 137-062 (KR); Young-Jun Kim, 1150-10, Baksuk-dong, Ilsan-ku, Koyang City, Kyungki-do 411-815 (KR)

( * ) Notice: Subject to any disclaimer, the term of this patent is extended or adjusted under 35 U.S.C. 154(b) by 373 days.

(21) Appl. No.: 10/530,763

(22) PCT Filed: Oct. 14, 2003

(86) PCT No.: PCT/KR03/02116

§ 371 (c)(1),
(2), (4) Date: Mar. 20, 2006

(87) PCT Pub. No.: WO2004/036717

PCT Pub. Date: Apr. 29, 2004

(65) Prior Publication Data

US 2006/0197493 A1     Sep. 7, 2006

(30) Foreign Application Priority Data

Oct. 14, 2002  (KR) ............... 10-2002-0062558
Oct. 14, 2002  (KR) ............... 20-2002-0030609

(51) Int. Cl.
*H01M 10/46* (2006.01)
(52) U.S. Cl. .................................... 320/108
(58) Field of Classification Search ........ 320/107, 320/108, 128, 132, 137, 140
See application file for complete search history.

(56) References Cited

U.S. PATENT DOCUMENTS 6,448,795 B1 * 9/2002 Ermakov et al. ............ 324/724

FOREIGN PATENT DOCUMENTS

| JP | 1997-223520 | * | 8/1997 |
| JP | 1999-40208 | * | 2/1999 |
| KR | 2001-0048695 | * | 6/2001 |
| KR | 2001-0074181 | * | 8/2001 |
| KR | 2001-0109964 | * | 12/2001 |

* cited by examiner

*Primary Examiner*—Edward Tso
(74) *Attorney, Agent, or Firm*—IPLA P.A.; James E. Bame

(57) ABSTRACT

The present invention relates to a non-contact type battery pack charging apparatus using a magnetic field. In the non-contact type battery pack charging apparatus of the present invention, a main control unit (120) receives input data from a voltage comparison unit (140), a current comparison unit (150), a voltage detection unit (170) and a current detection unit (180), determines whether required conditions are fulfilled, such as whether an object is installed, whether the installed object is a battery pack (200), what the charge capacity of the battery pack (200) is, and whether the charging of the battery pack (200) has been completed, and controls a variable-voltage frequency generation unit (130) to be operated so as to correspond to the required conditions. Accordingly, the charging of the battery pack (200) is performed to correspond to the charging capacity of the battery pack (200) only when the battery pack (200) is installed.

5 Claims, 2 Drawing Sheets

NON-CONTACT TYPE BATTERY PACK CHARGING APPARATUS

TECHNICAL FIELD

The present invention relates generally to a non-contact type battery pack charging apparatus using a magnetic field and, more particularly, to a non-contact type battery pack charging apparatus using a magnetic field, which is capable of stably charging various types of battery packs and reducing unnecessary power consumption.

BACKGROUND ART

As well known, a conventional battery pack charging apparatus is constructed in such a way that the charging terminals of a battery pack come in electrical contact with the charging terminals of the battery pack charging apparatus and power is supplied from the battery pack charging apparatus to the battery pack through the charging terminals of the battery pack and the battery pack charging apparatus.

However, in such a terminal contact type battery pack charging method, the charging of the battery pack is possible only when the terminals of the battery pack and the battery pack charging apparatus come in correct electrical contact with each other, so that the use of the contact type battery pack charging apparatus is considerably inconvenient. Furthermore, the positions of the charging terminals of the battery pack and the battery pack charging apparatus must be changed according to the various designs of potable devices including potable terminals, so that a problem arises in that dedicated battery pack charging apparatuses corresponding to the locations of the charging terminals of the battery pack.

To solve the problems, a non-contact type battery pack charging apparatus using a magnetic field is provided, as disclosed in Korean Pat. Appl. No. 1999-53492 and Korean Utility Model No. 2001-27153.

However, in Korean Pat. Appl. No. 1999-53492 and Korean Utility Model No. 2001-27153, a provision for satisfactorily charging battery packs having different charge capacities for a set time is not made, so that a problem arises in that the battery pack charging apparatuses corresponding to the charge capacities must be provided.

Furthermore, even though an inductive load (conductive material) other than a capacitive load is installed on the battery pack charging apparatus, the conventional non-contact type battery pack charging apparatus regards the inductive load as a capacitive load and performs charging operations, so that a problem arises in that unnecessary power consumption is incurred.

DISCLOSURE OF THE INVENTION

Accordingly, the present invention has been made keeping in mind the above problems occurring in the prior art, and an object of the present invention is to provide a non-contact type battery pack charging apparatus, which is capable of satisfactorily charging various battery packs having different charge capacities for an appropriate time and preventing unnecessary power consumption incurred by an inductive load.

In order to accomplish the above object, the present invention provides a non-contact type battery pack charging apparatus, including a power control unit for supplying Direct Current (DC) power to a main control unit and a variable-voltage frequency generation unit; the variable-voltage frequency generation unit for converting the DC power supplied from the power control unit into a frequency having an arbitrary voltage value and outputting the frequency to a magnetic field generation unit under the control of the main control unit; the magnetic field generation unit for receiving the frequency output from the variable-voltage frequency generation unit and radiating a magnetic force corresponding to the frequency to the outside; a voltage comparison unit for detecting a voltage value input to the magnetic field generation unit and a voltage value of the magnetic field generation unit, comparing the voltage values with each other, and outputting a voltage comparison value to the main control unit; a current comparison unit for detecting the voltage value input to the magnetic field generation unit and the voltage value of the magnetic field generation unit, converting the voltage values into current values, comparing the current values with each other, and outputting a current comparison value to the main control unit; a voltage detection unit for detecting a voltage value output from the variable-voltage frequency generation unit and outputting the voltage value to the main control unit; a current detection unit for detecting a voltage value of the magnetic field generation unit, converting the voltage value into a current value, and outputting the current value to the main control unit; and the main control unit for receiving signals output from the current comparison unit, the voltage comparison unit, the voltage detection unit and the current detection unit, and controlling the operations of the variable-voltage frequency generation unit.

BEST MODE FOR CARRYING OUT THE INVENTION

Embodiments of the present invention will be described in detail with reference to the attached drawings below.

Figure 1:
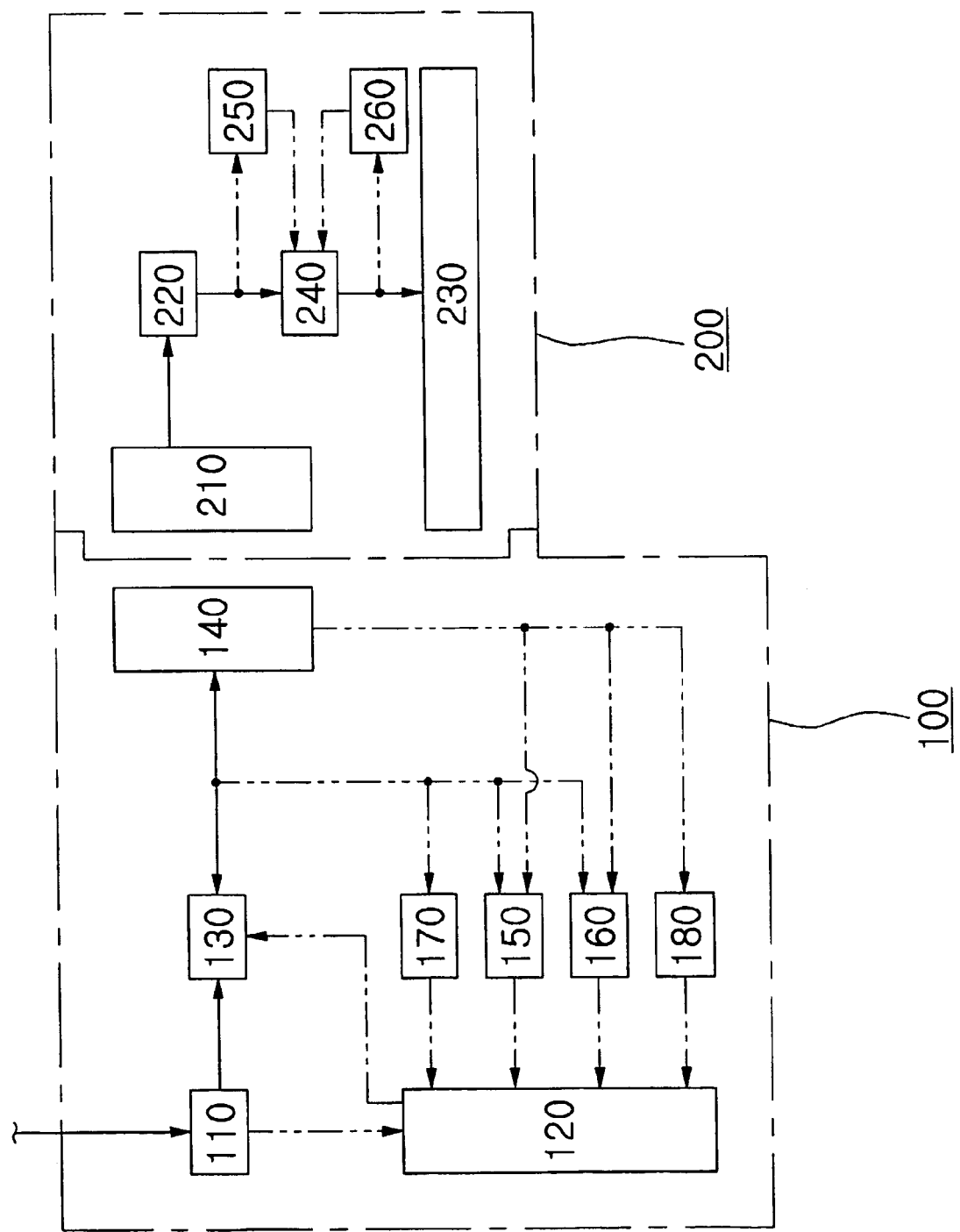
FIG. 1 is a block diagram showing an embodiment of a non-contact type battery pack charging apparatus according to the present invention.

FIG. 1 is a block diagram showing an embodiment of a non-contact type battery pack charging apparatus according to the present invention. As shown in FIG. 1, the non-contact type battery pack charging apparatus 100 according to the present invention includes a power control unit 110 for supplying DC power to a main control unit 120 and to a variable-voltage frequency generation unit 130; the variable-voltage frequency generation unit 130 for converting the DC power supplied from the power control unit 110 into a frequency having an arbitrary voltage value and outputting the frequency to a magnetic field generation unit 140 under the control of the main control unit 120; the magnetic field generation unit 140 for receiving the frequency output from the variable-voltage frequency generation unit 130 and radiating a magnetic force corresponding to the frequency to the outside; a voltage comparison unit 150 for detecting a voltage value input to the magnetic field generation unit 140 and the voltage value of the magnetic field generation unit 140, comparing the voltage values with each other, and outputting a voltage comparison value to the main control unit 120; a current comparison unit 160 for detecting the voltage value input to the magnetic field generation unit 140 and the voltage value of the magnetic field generation unit 140, converting the voltage values into current values, comparing the current values with each other, and outputting a current comparison value to the main control unit 120; a voltage detection unit 170 for detecting a voltage value output to the variable-voltage frequency generation unit 130 and outputting the voltage value to the main control unit 120; a current detection unit 180 for detecting the voltage value of the magnetic field generation unit 140, converting the voltage value into a current value, and outputting the current value to the main control unit 120; and the main control unit 120 for receiving signals output from the voltage comparison unit 150, the current comparison unit 160, the voltage detection unit 170 and the current detection unit 180, and controlling the operations of the variable-voltage frequency generation unit 130.

The main control unit 120 is supplied with DC power generally having 5V voltage, and the variable-voltage frequency generation unit 130 is supplied with DC power generally having 12V voltage. The magnetic field generation unit 140 preferably employs a coil that is wound in a circular shape in the plan view thereof (if a core with coils wound therearound is used, a problem arises in that the miniaturization of the battery pack charging apparatus is restricted), and the coil becomes a primary coil for inducing a magnetic field.

The operations of the non-contact type battery pack charging apparatus 100 according to an embodiment of the present invention are described below.

When DC power is supplied to the power control unit 110 from the outside, the DC power is supplied from the power control unit 110 to the main control unit 120 and the variable-voltage frequency generation unit 130. When the initial DC power is supplied to the main control unit 120 and the variable-voltage frequency generation unit 130, the main control unit 120 outputs an initial control signal to the variable-voltage frequency generation unit 130, so that a low-voltage frequency, which is used to determine whether a battery pack 200 is installed on the battery pack charging apparatus 100 and whether an object installed on the battery pack charging apparatus 100 is an inductive load (conductive material) or a capacitive load (battery pack), is output from the variable-voltage frequency generation unit 130. When the low-voltage frequency output from the variable-voltage frequency generation unit 130 is supplied to the magnetic field generation unit 140, the magnetic field generation unit 140 radiates a magnetic force corresponding to the low-voltage frequency.

If the current state of the battery pack charging apparatus 100 is a non-load state (the state in which no object is installed on the battery pack charging apparatus, that is, the induction of a magnetic field is not performed), a voltage comparison value input to the main control unit 120 from the current comparison unit 160 satisfies the range of reference voltage values pre-input to the main control unit 120. Accordingly, the main control unit 120 can be aware that the current state is the non-load state using the criterion, and the above-operation is repeated until the main control unit 120 becomes aware of a capacitive load.

If the current state is an inductively loaded state (a conductive material is installed on the battery pack charging apparatus, so that the magnetic force generated from the magnetic field generation unit is induced into the conductive material), a voltage comparison value input to the main control unit 120 from the voltage comparison unit 150 is higher than the range of reference voltage values pre-input to the main control unit 120. Accordingly, the main control unit 120 can be aware that the current state is the inductively loaded state using the criterion, and the above-operation is repeated until the main control unit 120 becomes aware of a capacitive load.

If the current state is a capacitively loaded state (a discharged battery pack is installed on the battery pack charging apparatus), a voltage comparison value input to the main control unit 120 from the voltage comparison unit 150 is lower than the range of reference voltage values pre-input to the main control unit 120. Accordingly, the main control unit 120 can be aware that the current state is the capacitively loaded state using the criterion, and, thereafter, performs a next operation. In this case, the voltage comparison value of the voltage comparison unit 150 is a value obtained by subtracting the detected voltage value input to the magnetic field generation unit 140 from the detected voltage value of the magnetic field generation unit 140. For reference, the detected voltage value of the magnetic field generation unit 140 increases when an inductive load adjoins the battery pack charging apparatus 100, and decreases when a capacitive load adjoins the battery pack charging apparatus 100, on the basis of that of the non-load state.

Meanwhile, if the voltage value of the magnetic field generation unit 140 is changed on the basis of that of the non-load state, the current value of the magnetic field generation unit 140 is also changed corresponding to the changing of the voltage value. Thus, the present invention is not limited to the above embodiment, but it can be determined whether the current state is the non-load state, and the inductively loaded state or the capacitively loaded state, using the current comparison value generated from the current comparison unit 160.

If the current state is the capacitively loaded state, the main control unit 120 outputs a control signal used to determine the charge capacity of the battery pack 200 to the variable-voltage frequency generation unit 130, so that the voltage value of the frequency output from the variable-voltage frequency generation unit 130 is caused to gradually increase. In this case, the battery cell 230 of the battery pack 200 has been discharged, so that the current value of the magnetic field generation unit 140 increases correspondingly. If the voltage value of the frequency output from the variable-voltage frequency generation unit 130 gradually increases, the magnetic force radiated from the magnetic field generation unit 140 increases correspondingly, so that the magnetic force induced into the magnetic field receiving unit 210 of the battery pack 200 gradually increases and, thus, an induced electromotive force (Alternating Current (AC)) supplied to a rectifying unit 220 also increases. Meanwhile, the induced electromotive force supplied to the rectifying unit 220 is converted into DC power, and the converted DC power is supplied to the battery cell 230 through a circuit breaker 240. Thus, if the induced electromotive force supplied to the rectifying unit 220 gradually increases, the DC power supplied to the battery cell 230 also gradually increases. In the mean time, the circuit breaker 240 of the battery cell 230 receives detected voltage and current values from an overvoltage detection unit 250 and an overcurrent detection unit 260, respectively, compares the detected voltage and current values with reference voltage and current values corresponding to the predetermined charge capacity of the battery cell 230, respectively, and cut off power supply to the battery cell 230 when the detected voltage and current values exceed the reference voltage and current values, respectively (in the case of a discharged battery cell, the detected current value exceeds the reference current value faster than the detected voltage value exceeds the reference voltage value, so that it can be mentioned that the circuit breaker can cut off the power supply to the battery cell by the excess of the detected current value). When the power supply to the battery cell 230 is cut off by the circuit breaker 240, the main control unit 120 detects the cutting off of the power supply using the voltage comparison value of the voltage comparison unit 150 and/or the current comparison value of the current comparison unit 160, detects the value of power supplied to the battery cell 230 using the detected voltage and current values output from the voltage detection unit 170 and the current detection unit 180, respectively, at the time when the power supply to the battery cell 230 is cut off, and, thereafter, determines the power capacity of the battery cell 230.

After the main control unit 120 determines the power capacity of the battery cell 230, the main control unit 120 outputs a control signal (the control signal can be set in advance or can be set through an operation) corresponding to the power capacity of the battery cell 230 to the variable-voltage frequency generation unit 130, so that the variable-voltage frequency generation unit 130 is caused to uniformly output the frequencies of a voltage value suitable for the charging of the battery cell 230.

When the charging of the battery cell 230 is completed, the detected voltage and current values output from the overvoltage detection unit 250 and overcurrent detection unit 260, respectively, are higher than the reference voltage and current values, so that the power supply from the circuit breaker 240 to the battery cell 230 is cut off (in the case of a charged battery cell, the detected voltage value exceeds the reference voltage value faster than the detected current value exceeds the reference current value, so that it can be mentioned that the circuit breaker can cut off the power supply to the battery cell by the excess of the detected current value). When charging is completed and the power supply to the battery cell 230 is cut off by the circuit breaker 240, the main control unit 120 becomes aware of the completion of the charging of the battery cell 230 using the voltage comparison value of the voltage comparison unit 150 and/or the current comparison value of the current comparison unit 160, and the process is returned to the initial operation.

According to the present invention, the main control unit 120 determines whether required conditions are met, such as whether an object is installed on the battery pack charging apparatus 100, whether the installed object is a battery pack 200, what the charge capacity of the battery pack 200 is, and whether the charging of the battery pack 200 has been completed, using data input from the voltage comparison unit 150, the current comparison unit 160, the voltage detection unit 170 and the current detection unit 180, and then controls the variable-voltage frequency generation unit 130 to be properly operated so as to correspond to the required conditions. Accordingly, the charging of the battery pack 200 is performed to correspond to the charging capacity of the battery pack 200 only when the battery pack 200 is installed on the battery pack charging apparatus 100.

Figure 2:
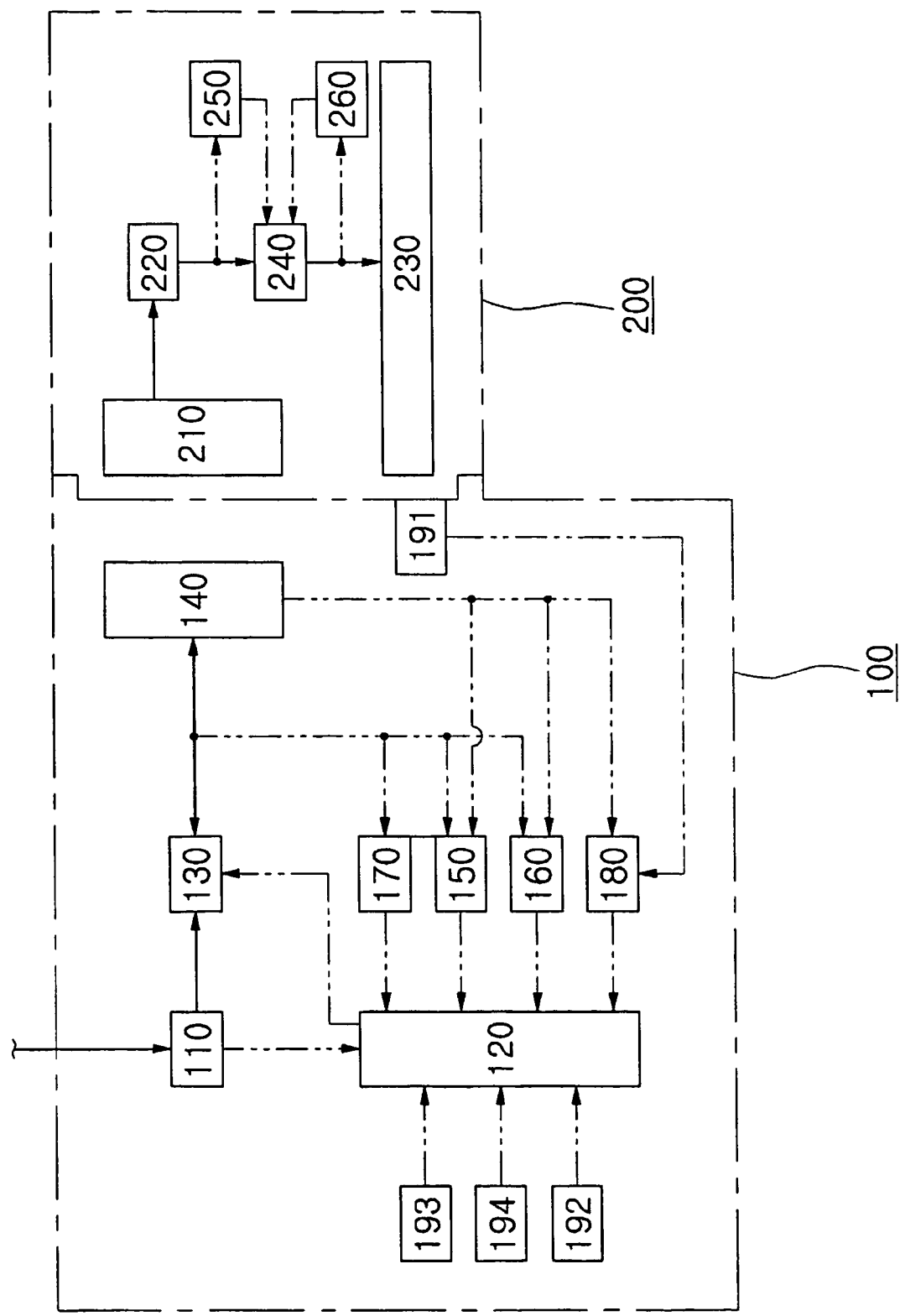
FIG. 2 is a block diagram showing another embodiment of the non-contact type battery pack charging apparatus according to the present invention.

The non-contact type battery pack charging apparatus 100 is modified and embodied in various ways, as shown in FIG. 2. For example, if a battery pack detection unit 191 for detecting whether the battery pack 200 is installed is connected to the main control unit 120 and used, an initial detection signal to detect whether the battery pack 200 is installed does not have to be continuously output in the state of waiting for operations, so that the consumption of unnecessary power can be prevented. The operations of the above case are described below. If the battery pack detection unit 191 detects does not detect the installation of any object, the state of waiting for operations is maintained in which DC power from the power control unit 110 is supplied to the main control unit 120 and the variable-voltage frequency generation unit 130. On the contrary, if the battery pack detection unit 191 detects an installed object, the main control unit 120 receives a detection signal, and outputs an initial control signal to the variable-voltage frequency generation unit 130, so that the variable-voltage frequency generation unit 130 is caused to output a low-voltage frequency to determine whether the installed object is the inductive load or the capacitive load (that is, whether the installed object is a battery pack or some other object). Furthermore, the variable-voltage frequency generation unit 130 performs the above-described operations so that current load state is determined, and performs operations corresponding to a corresponding loaded state, so that power consumption in the non-load state is reduced.

If a charging time selection unit 192, which can freely change the time required for charging of the battery pack 200, is connected to the main control unit 120 and used, as shown in FIG. 2, the functions of the battery pack charging apparatus 100 can be various. The battery cell 230 of the battery pack 200 can be used for a long time when the battery cell 230 is charged for a constant time with power having current/voltage values corresponding to the power capacity thereof. However, a user may request fast charging, so that it is desirable that the time required for the charging can be controlled using the charging time selection unit 192, thus satisfying the various demands of the user. It is assumed that the charging of the battery cell 230 with power having proper current and voltage values for two hours is a reference. If the user selects a one-hour charging mode by manipulating the charging time selection unit 192, the main control unit 120 controls the operations of the variable-voltage frequency generation unit 130 and boosts the voltage and current values of DC power supplied to the battery cell 230 so as to charge the battery cell 230 for an hour. In this case, attention must be paid to the fact that the voltage and current values of the DC power supplied to the battery cell 230 cannot excess the reference values of the overvoltage detection unit 250 and the overcurrent detection unit 260.

If an operational status display unit, which allows a user to be aware of the operational status of the battery pack charging apparatus 100, is connected to the main control unit 120 and used, as shown in FIG. 2, the user may exactly be aware of the operational status of the battery pack charging apparatus 100, so that an advantage arises in that the user can properly cope with the operational status of the battery pack charging apparatus 100. In the case of this embodiment, an abnormal status display unit 193 for displaying operating errors of the battery pack charging apparatus 100, and a charging status display unit 194 for displaying whether the charging of the battery pack 200 is being performed or is completed when the battery pack charging apparatus 100 is normally performed, are used. Light Emitting Diodes (LED) are generally used as the abnormal status display unit 193 and the charging status display unit 194, which are distinguished from each other by colors radiated therefrom.

Although a few preferred embodiments of the present invention have been shown and described, it would be appreciated by those skilled in the art that changes may be made in these embodiments without departing from the principles and spirit of the invention, the scope of which is defined in the claims and their equivalents.

INDUSTRIAL APPLICABILITY

As described above, the present invention provides a non-contact type battery pack charging apparatus 100 in which the operations of the non-contact type battery pack charging apparatus 100 are automatically controlled so as to meet required conditions, such as whether an object is installed, whether the installed object is a battery pack 200, what the charge capacity of the battery pack 200 is, and whether the charging of the battery pack 200 has been completed, so that the charging of the battery pack 200 is performed to correspond to the charging capacity of the battery pack 200 only when the battery pack 200 is installed. Thus, it is effective in that the battery pack charging apparatus 100 can be extensively used without limitations upon the charge capacity of the battery pack 200 and unnecessary power consumption can be reduced.

The invention claimed is:

1. A non-contact type battery pack charging apparatus, comprising:
   a power control unit for supplying Direct Current (DC) power to a main control unit and a variable-voltage frequency generation unit;
   the variable-voltage frequency generation unit for converting the DC power supplied from the power control unit into a frequency having an arbitrary voltage value and outputting the frequency to a magnetic field generation unit under the control of the main control unit;
   the magnetic field generation unit for receiving the frequency output from the variable-voltage frequency generation unit and radiating a magnetic force corresponding to the frequency to the outside;
   a voltage comparison unit for detecting a voltage value input to the magnetic field generation unit and a voltage value of the magnetic field generation unit, comparing the voltage values with each other, and outputting a voltage comparison value to the main control unit;
   a current comparison unit for detecting the voltage value input to the magnetic field generation unit and the voltage value of the magnetic field generation unit, converting the voltage values into current values, comparing the current values with each other, and outputting a current comparison value to the main control unit;
   a voltage detection unit for detecting a voltage value output from the variable-voltage frequency generation unit and outputting the voltage value to the main control unit;
   a current detection unit for detecting a voltage value of the magnetic field generation unit, converting the voltage value into a current value, and outputting the current value to the main control unit; and
   the main control unit for receiving signals output from the current comparison unit, the voltage comparison unit, the voltage detection unit and the current detection unit and controlling the operations of the variable-voltage frequency generation unit.

2. The non-contact type battery pack charging apparatus as set forth in claim 1, wherein the main control unit is connected with a battery pack detection unit for detecting whether the battery pack is installed.

3. The non-contact type battery pack charging apparatus as set forth in claim 1, wherein the main control unit is connected with a charging time selection unit for freely changing time required for charging of the battery pack.

4. The non-contact type battery pack charging apparatus as set forth in claim 1, wherein the main control unit is connected with an operational status display unit for allowing a user to be aware of operational status of the battery pack charging apparatus.

5. The non-contact type battery pack charging apparatus as set forth in claim 4, wherein the operational status display unit includes an abnormal status display unit for displaying operating errors of the battery pack charging apparatus and a charging status display unit for displaying whether charging of the battery pack is being performed or is complete when the battery pack charging apparatus is normally performed.

* * * * *